United States Patent
Nagai et al.

[11] Patent Number: 6,101,793
[45] Date of Patent: Aug. 15, 2000

[54] EXHAUST GAS FILTER, METHOD OF PRODUCING THE SAME, AND EXHAUST GAS PURIFICATION APPARATUS

[75] Inventors: Nobuaki Nagai; Shinji Wada; Yuichi Murano, all of Miyazaki-ken; Sachinori Ikeda, Miyazaki, all of Japan

[73] Assignee: Matsushita Electric Industrial Co., Ltd., Osaka, Japan

[21] Appl. No.: 09/063,063

[22] Filed: Apr. 21, 1998

[30] Foreign Application Priority Data

Apr. 22, 1997 [JP] Japan ................................ 9-104461

[51] Int. Cl.$^7$ .................................................. B01D 39/20
[52] U.S. Cl. ................................. 055/523; 055/DIG. 5; 055/DIG. 10; 055/DIG. 30
[58] Field of Search ..................... 55/523, DIG. 5, 55/DIG. 10, DIG. 30

[56] References Cited

U.S. PATENT DOCUMENTS

| | | | |
|---|---|---|---|
| 4,364,760 | 12/1982 | Higuchi et al. | 55/523 |
| 4,364,761 | 12/1982 | Berg et al. | 55/523 |
| 4,759,918 | 7/1988 | Homeier et al. | 55/523 X |
| 5,223,318 | 6/1993 | Faber et al. | 55/523 X |
| 5,497,620 | 3/1996 | Stobbe | 55/523 X |
| 5,549,725 | 8/1996 | Kasai et al. | 55/523 |
| 5,641,332 | 6/1997 | Faber et al. | 55/523 |
| 5,700,373 | 12/1997 | Ritland | 55/523 X |
| 5,716,559 | 2/1998 | Larsen et al. | 55/523 X |
| 5,824,220 | 10/1998 | Grangeon et al. | 55/523 X |

FOREIGN PATENT DOCUMENTS

| | | |
|---|---|---|
| 62-225249 | 10/1987 | Japan. |
| 252015 | 2/1990 | Japan. |

OTHER PUBLICATIONS

Abstract of U.S. Patent No. 4,364,761 issued Jun. 15, 1981.

*Primary Examiner*—Robert H. Spitzer
*Attorney, Agent, or Firm*—Stevens, Davis, Miller & Mosher, L.L.P.

[57] ABSTRACT

An exhaust gas filter having a ceramic filter body is configured such that a specific heat h (cal/g° C.) of ceramic powder constituting the body, and a bulk specific gravity d (g/cm$^3$) of the filter, satisfy the relation 0.12 (cal/cm$^{3\circ}$ C.)$\leq$h$\times$d$\leq$0.19 (cal/cm$^{3\circ}$ C.). The ceramic filter body includes a plurality of cells which extend axially to open at opposite ends of the body. One of the opposite axial ends of each of the cells is closed by a filler in such a manner that the closed ends of the cells and the open ends of the cells are arranged in an alternating configuration. The filter traps particulates in the exhaust gas, and the trapped particulates are removed by regeneration combustion of the filter. The filter exhibits excellent durability, thus preventing the formation of cracks in the surface and interior of the filter. When the filter is mounted on a diesel engine, the diesel engine advantageously does not discharge black smoke.

7 Claims, 5 Drawing Sheets

EXHAUST GAS FILTER, METHOD OF PRODUCING THE SAME, AND EXHAUST GAS PURIFICATION APPARATUS

BACKGROUND OF THE INVENTION

The present invention relates to an exhaust gas filter suitable for removing black smoke contained in exhaust gas from a diesel engine mounted on a bus, a truck, a forklift truck and the like. The present invention also relates to a method of producing such an exhaust gas filter, and an exhaust gas purification apparatus provided with such an exhaust gas filter.

Recently, in large cities, air pollution due to NOx and floating particulate matter has been more and more advanced, and has now become a serious social problem. It is announced that particulates in the black smoke discharged from the diesel engine occupy 30% to 40% of the floating particulate matter in the atmosphere, and mutagenic and carcinogenic components, e.g. polynuclear aromatic hydrocarbons such as benzpyrene are contained in the black smoke particulates.

An exhaust gas purification apparatus of the type which arrests or traps the particulates in an exhaust system, and then effects self regeneration is expected to be most effective for dealing with black smoke. This exhaust gas purification apparatus is provided in the exhaust system, and mainly comprises an exhaust gas filter for trapping the black smoke particulates in the exhaust gas, and a regenerator for burning to remove the trapped black smoke particulates. The regeneration in this regenerator may be effected by an electric heater, a burner, hot air, or a backwash, each of which has advantages and disadvantages.

The mainstream of such exhaust gas filters has heretofore been a ceramic monolithic wall flow type filter (hereinafter referred to as "ceramic monolithic filter") for trapping black smoke particulates disclosed, for example, in U.S. Pat. No. 4,364,761.

In FIG. 3 showing a longitudinal sectional view of a conventional ceramic monolithic filter, a reference numeral 11 denotes a cylindrical filter body made of ceramics, and a number of cells 12 and 13 are formed in this body 11, each extending axially. A plug 14 made of ceramic is provided in an exhaust gas inlet side end of each of the cells 12 and the plug 14 is also provided in an exhaust gas outlet side end of each of the cells 13. These cells 12 and 13 are so arranged that they alternate with each other.

In the exhaust gas filter of this construction, the exhaust gas containing black smoke flows through the cells 13 each having the closed outlet side end into the adjacent cells 12 each having the closed inlet side end via porous partition walls 17. The black smoke is filtered when it passes through the porous partition walls 17, and therefore the black smoke particulates are trapped by the porous partition walls 17. When the amount of the trapped black smoke particulates increases, the porous partition walls 17 are clogged by the black smoke particulates, so that a back pressure of an exhaust device of an associated diesel engine increases. Therefore, it is necessary to remove the trapped black smoke particulates from the filter when their amount exceeds a predetermined level, so as to suppress the increase of the load on the engine due to the increment of the back pressure.

The black smoke particulates contain a fixed carbon component and a soluble organic component soluble in an organic solvent. These components are both combustible, and burn out at 650° C. or higher though this temperature slightly differs depending on the kind of engine and the load condition. Therefore, it has been proposed to burn out the trapped black smoke particulates by means of heating means, such as an electric heater, a burner and hot air, so as to regenerate the porous partition walls 17.

In order to decrease a thermal stress produced by a temperature gradient developing at the time of this regeneration combustion, the conventional exhaust filter element is made of cordierite which is a typical example of ceramic material of a low thermal expansion. For example, Japanese Patent Unexamined Publication No. 62-225249 discloses a cordierite honeycomb-structure catalyst carrier. It comprises a honeycomb structure which consists, by weight, mainly of 42% to 56% $SiO_2$, 30% to 45% $Al_2O_3$ and 12% to 16% MgO, and has a crystal phase composed mainly of cordierite, and whose porosity is not more than 30%. A thermal expansion coefficient of the honeycomb structure in its axial direction at a temperature of 40° C. to 800° C. is not more than $0.8 \times 10^{-6}$, and the thermal expansion coefficient in a diametric direction at 40° C. to 800° C. is not more than $1.0 \times 10^{-6}$. Japanese Patent Unexamined Publication No. 2-52015 discloses a porous ceramic honeycomb filter which consists, by weight, mainly of 42% to 56% $SiO_2$, 30% to 45% $Al_2O_3$ and 12% to 16% MgO, and has a crystal phase composed mainly of cordierite, and whose porosity is in the range of 40% and 55%, and a volume of pores of a diameter of not more than 2 $\mu$m is not more than 0.015 cc/g.

As described above, the exhaust gas filter provided in the exhaust system of the diesel engine is regenerated after trapping the black smoke particulates in order to suppress the increase of the back pressure of the exhaust device of the diesel engine. In connection with the regeneration combustion, it is required that no crack develop in the surface and interior of the exhaust gas filter even if a thermal stress develops in the filter itself, and that no melting damage due to a temperature rise caused by abnormal combustion develop in the exhaust gas filter.

However, in either of the conventional examples, the cracks and the melting damage develop simultaneously in the exhaust gas filter due to an abrupt temperature rise and the high combustion temperature during the regeneration combustion of the exhaust gas filter.

The inventors of the present application actually conducted a test in which a conventional exhaust gas filter composed mainly of cordierite was mounted in an exhaust system of a diesel engine, and the black smoke particulates were trapped at 15 g per unit volume (1 liter) of the exhaust gas filter, and then the filter was regenerated by an electric heater. The thermocouple indicated that the temperature rise rate of a specified portion of the filter during the regeneration combustion reached 50° C./min., and the combustion temperature reached 1,400° C. Then, the exhaust gas filter 21 subjected to the regeneration combustion was removed from the exhaust system of the engine, and was inspected. As a result, it was confirmed that cracks 22 developed in the surface of the filter body as shown in FIG. 4, and that the interior of the filter body partially melted down.

Also, an exhaust gas filter which consisted, by weight, mainly of 42% to 56% $SiO_2$, 30% to 45% $Al_2O_3$ and 12% to 16% MgO, and had a crystal phase composed mainly of cordierite was mounted in an exhaust system of a diesel engine, and there was carried out a cyclic test in which after the engine was operated for 5 hours under predetermined conditions, the trapped black smoke particulates were burned out for regeneration. During the second operation, black smoke was discharged from an exhaust outlet port. Then, the exhaust gas filter was removed from the exhaust system of the engine and inspected. As a result it was found that large cracks were formed in the surface of the filter.

The conventional exhaust gas filter has a bulk specific gravity d of about 0.45 g/cm$^3$. The bulk specific gravity of the exhaust gas filter can be calculated by dividing the weight of the exhaust gas filter by the volume of the exhaust gas filter. The volume of the exhaust gas filter is the product obtained by multiplying the section area and the height, and also includes the cells and the pores. A ceramic material, constituting a body of the exhaust gas filter used in the above test, was pounded into powder in an agate mortar to measure its specific heat h. Its value is about 0.204 cal/g° C., and the product h×d of the bulk specific gravity and the specific heat is relatively small, i.e., about 0.092 cal/cm$^{3°}$ C.

Thus, in the conventional exhaust gas filter composed mainly of cordierite, the product h×d, the specific heat per unit volume, is relatively small, and therefore the filter is subjected to an abrupt temperature rise during the regeneration combustion effected after it traps the black smoke, and tends to reach a higher combustion temperature. From this, it is presumed that cracks and melting damage develop because of the abrupt temperature rise and high combustion temperature during the regeneration combustion.

SUMMARY OF THE INVENTION

It is therefore an object of this invention to provide an exhaust gas filter in which an abrupt temperature rise will not occur in the filter during regeneration combustion of the filter, and the combustion temperature is kept relatively low so that cracks and melting damage will not develop in the surface and interior of the filter, thereby achieving excellent durability of the exhaust gas filter.

According to one aspect of the present invention, there is provided an exhaust gas filter in which a product h×d of a specific heat h (cal/g° C.) of the powder of a ceramic constituting the filter body and a bulk specific gravity d (g/cm$^3$) of the exhaust gas filter is between 0.12 and 0.19, namely 0.12 (cal/cm$^{3°}$ C.)$\leq$h×d$\leq$0.19 (cal/cm$^{3°}$ C.), and the regeneration combustion temperature is not more than 70% of a melting point of the ceramic. With this construction, there is obtained the exhaust gas filter in which an abrupt temperature rise will not occur during the regeneration combustion of the exhaust gas filter, and any crack and melting damage will not develop in the surface and interior of the exhaust gas filter body.

According to another aspect of the invention, there is provided a diesel engine provided with an exhaust gas filter of excellent durability in which a product h×d of a specific heat h (cal/g° C.) of the powder of a ceramic constituting the filter body and a bulk specific gravity d (g/cm$^3$) of the exhaust gas filter is between 0.12 and 0.19, namely 0.12 (cal/cm$^{3°}$ C.)$\leq$h×d$\leq$0.19 (cal/cm$^{3°}$ C.). There is obtained an exhaust gas purification apparatus for a diesel engine and the like, in which black smoke will not be discharged from an exhaust outlet port during the operation of the engine.

DESCRIPTION OF PREFERRED EMBODIMENTS

Figure 1:
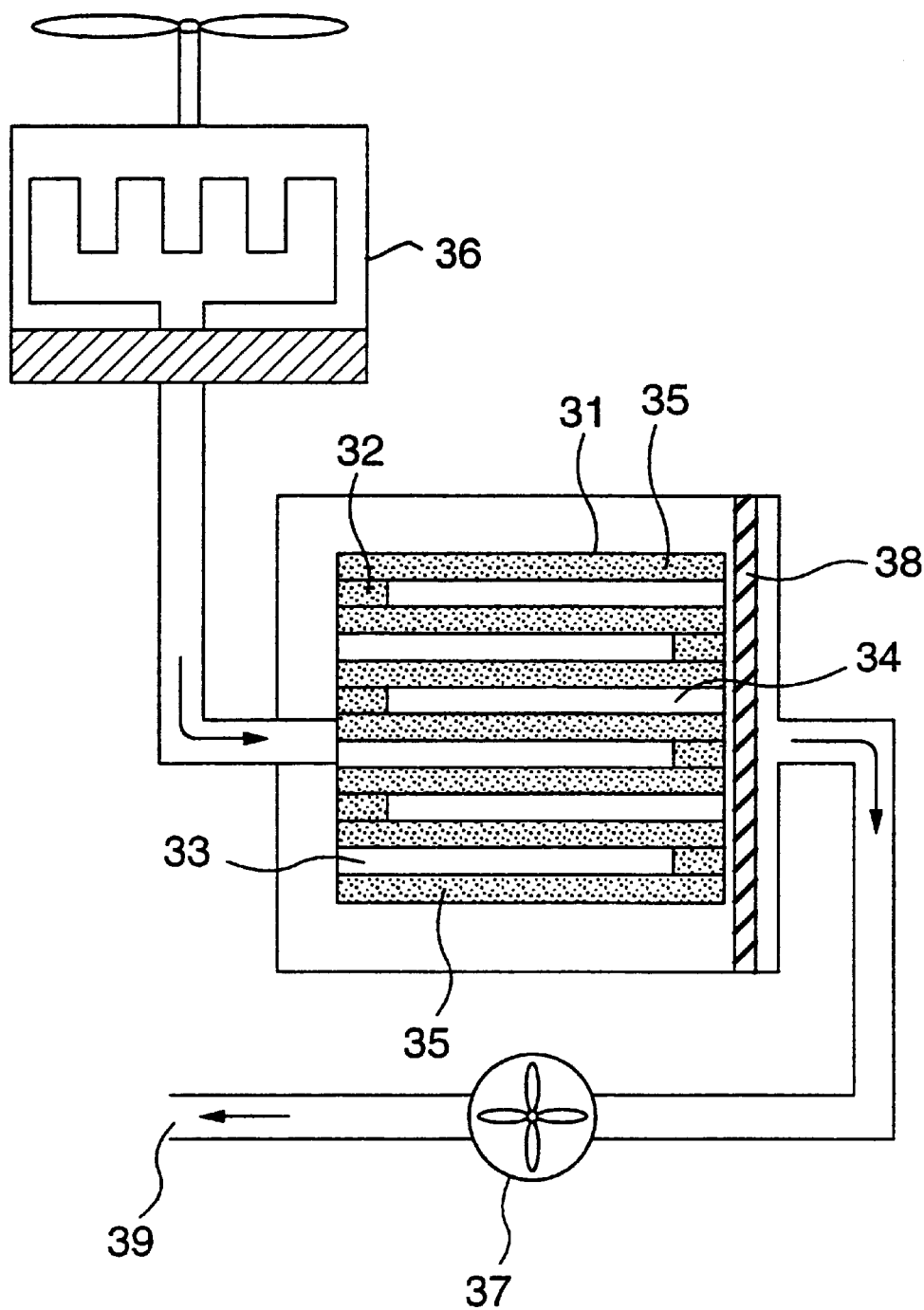
FIG. 1 is a schematic cross-sectional view showing a preferred embodiment of an exhaust gas filter of the present invention mounted on a diesel engine.
Figure 1A:
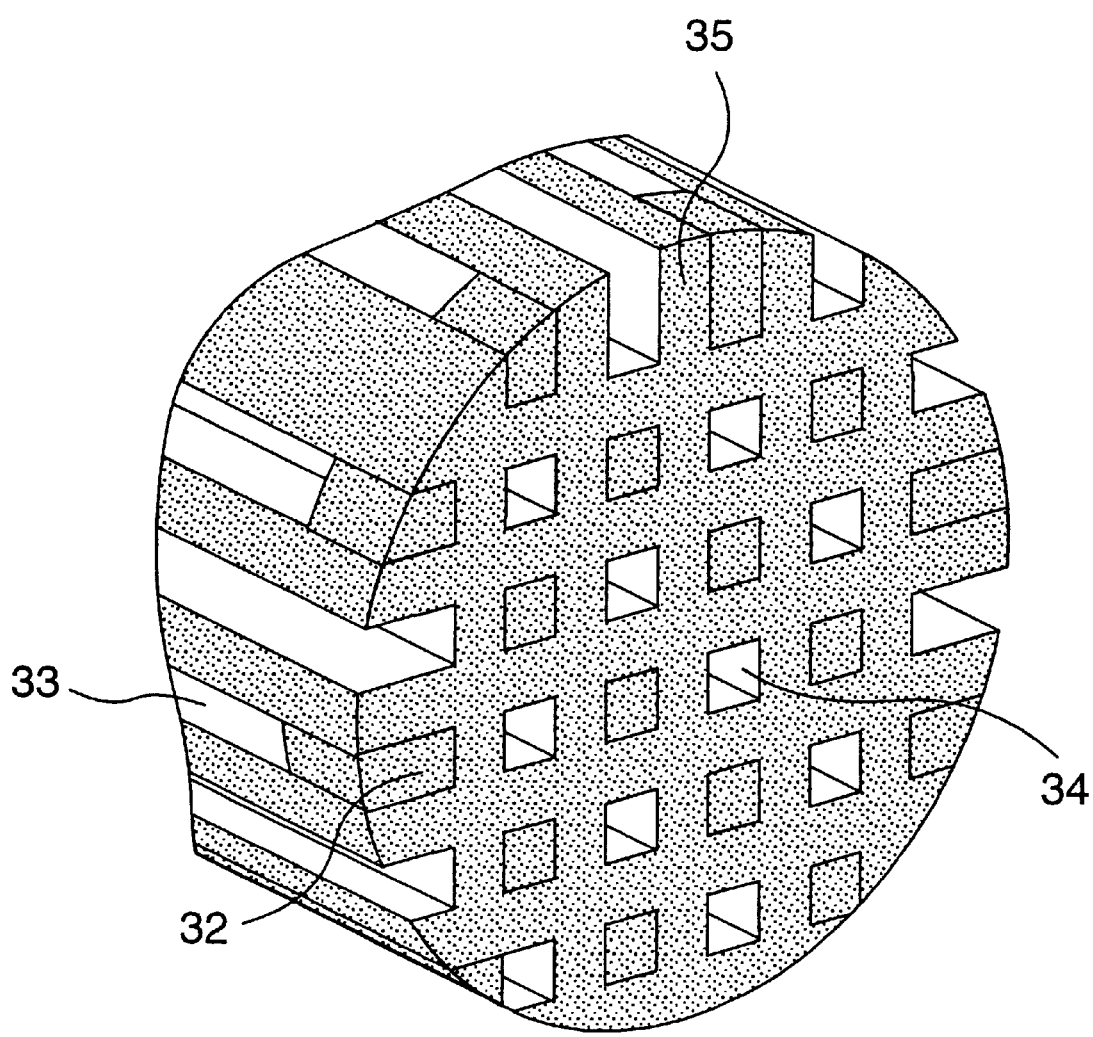
FIG. 1A is a fragmentary perspective view showing a filter body shown in FIG. 1.

In FIG. 1, an exhaust gas filter according to one embodiment of the present invention which is housed in a casing includes a cylindrical filter body 31. The exhaust gas flows from a diesel engine 36 towards an outlet port 39 through the filter. The filter body 31 comprises a plurality of inlet cells 33 and a plurality of outlet cells 34. In the drawings, in order to make the explanation simple the number of cells is substantially reduced. These cells 33 and 34 are quadratic prisms, and axially extend to opposite ends thereof. An outlet side end of each of the inlet cells 33 is closed by a plug 32, and an inlet side end of each of the outlet cells 34 is also closed by a plug 32. As shown in FIG. 1A, the inlet cells 33 and the outlet cells 34 diametrically alternate with one another through partition walls 35. The exhaust gas including black smoke from the diesel engine 36 flows into the inlet cells 33, and is filtered by the partition walls 35 and then flows out to the outlet cells 34. The exhaust gas from which the black smoke particulates are removed by the partition walls 35 flows out from the outlet port 39.

An electric heater 38 is provided in the casing adjacent the outlet side ends of the cells 33 and 34 and a blower 37 is provided in a passage between the casing and the outlet port 39. After the operation of the diesel engine 36 for a predetermined time period, air is fed towards the filter by means of the blower 37 and is heated by means of the electric heater 38. Accordingly, the black smoke particulates trapped in the partition walls 35 are burnt out, thereby suppressing the increase of a back pressure of an exhaust device of the diesel engine 36. Namely, there can be achieved the regeneration combustion of the exhaust gas filter body 31 in which the trapped black smoke particulates are removed by combustion, using the electric heater 38 as an ignition source.

A method of producing the exhaust gas filter is described hereinafter.

Aluminum titanate based powder composed mainly of aluminum titanate, a binder containing hydroxypropylmethyl cellulose, a lubricant of polymeric ester, a pore-forming agent of polyethylene, and water are blended in the rate shown in Table 1. Then, they are mixed by a high-speed mixer for 3 minutes, and kneaded for 30 minutes to 120 minutes by a kneader to become a ceramic plastic material.

TABLE 1

|  | Blend ratio (weight part) |
| --- | --- |
| Aluminum titanate powder | 100 |
| Binder | 20 |
| Lubricant | 5 |
| Pore-forming agent | 18 |
| Water | 30 |

Using a vacuum extruder having a die capable of forming a lump of the ceramic plastic material into a cylindrical filter body, the ceramic plastic material is formed into a molded filter body having a number of prism cells extending in an axial direction, of a diameter of 170 mm and a height (length) of 180 mm. Then, the extruded (molded) filter body is dried using a microwave dryer and a hot air type dryer, and baked at 1,450° C. to 1,530° C. for 1 hour to 4 hours so that its bulk specific gravity is not less than 0.6 (g/cm$^3$) and not more than 1.0 (g/cm$^3$). It is finished up into the exhaust gas filter body 31 shown in FIG. 1, having a diameter of 140 mm and a height of 150 mm. Under baking conditions in which the body is baked at under 1,450° C., the bulk specific gravity becomes less than 0.6 (g/cm$^3$), while under baking conditions in which the body is baked at beyond 1,530° C., the bulk specific gravity becomes more than 1.0 (g/cm$^3$).

The exhaust gas filter body 31 has a cylindrical body having a number of cells 33 and 34 each extending in the axial direction, and a plug 32 is provided in either one of the opposite ends of each of the cells 33 and 34 in such a manner that the closed end and the open ends diametrically alternate one another in the end surface of the filter body 31. The exhaust gas filter body 31 does not have any structural defect such as a crack in the surface and in the interior thereof, and deformation in the porous partition walls 35, and therefore has the good configuration and structure.

When the bulk specific gravity d of the finished exhaust gas filter body 31 is measured from its own weight and volume, its value is 0.84 g/cm$^3$. A small piece of the exhaust gas filter 31 is taken therefrom and crushed into powder in an agate mortar, and the specific heat h is measured by a differential scanning calorimeter (manufactured by SEIKO ELECTRONICS K. K.). The specific heat is 188 cal/g° C. The product h×d is 0.158 cal/cm$^3$° C., which means that the calorie required to raise the temperature of unit volume (1 cm$^3$) of the exhaust gas filter body 31 by 1° C.

As shown in FIG. 1, the obtained exhaust gas filter 31 is mounted on an exhaust system of a diesel engine (manufactured by TOYOTA MOTOR COMPANY LTD.) with a displacement of 3,431 cc, and the engine is operated for a predetermined time period at a rotation torque 21 kgm, and engine speed 1,500 rpm, and black smoke particulates are trapped by the exhaust gas filter body 31 at a rate of 15 g per unit volume (1 liter) of the filter body. Thereafter, the trapped black smoke particulates are burned out by the electric heater 38 as the ignition source while feeding the air by means of the blower 37 at a rate of about 70 liters per minute, thereby effecting the regeneration combustion of the exhaust gas filter 31.

By means of a plurality of thermo couples (Pt—PtRh13%) inserted respectively into predetermined positions within the exhaust gas filter 31 and connected to a chopper bar-type hybrid recorder, the combustion temperature (regeneration combustion curve) with respect to the lapse of time is recorded. The temperature rising rate (° C./min.) and the combustion temperature are detected accordingly. After regeneration combustion, the exhaust gas filter 31 is removed from the exhaust system of the diesel engine and inspected to determine whether any crack and melting damage have developed. The conventional exhaust gas filters each having a diameter of 140 mm and a height of 150 mm and being made of different materials are selected and examined under the same conditions as described above. Results are shown in Table 2.

TABLE 2

|  | Bulk Specific Gravity d (g/cm$^3$) | Specific Heat h (cal/g ° C.) | d × h (cal/cm$^3$ ° C.) | Max. Burning Temp. (° C.) | Max. Temp. Gradient (° C./min) | Condition after Regeneration Combustion | Evaluation |
|---|---|---|---|---|---|---|---|
| Exhaust Gas Filter 1 (Aluminum Titanate) | 0.84 | 0.188 | 0.158 | 1080 | 31 | No Crack No Melting Damage | ○ |
| Exhaust Gas Filter 2 (Aluminum Titanate) | 0.67 | 0.180 | 0.120 | 1100 | 43 | No Crack No Melting Damage | ○ |
| Exhaust Gas Filter 3 (Aluminum Titanate) | 0.97 | 0.196 | 0.190 | 1020 | 28 | No Crack No Melting Damage | ○ |
| Conventional Exhaust Gas Filter 1 (Cordient) | 0.45 | 0.193 | 0.087 | 1410 | 85 | Crack Melting Damage | x |
| Conventional Exhaust Gas Filter 2 (Cordient) | 0.50 | 0.191 | 0.096 | 1350 | 70 | Crack | x |
| Conventional Exhaust Gas Filter 3 (Cordient) | 0.44 | 0.193 | 0.085 | 1400 | 67 | Crack | x |
| Conventional Exhaust Gas Filter 4 (Cordient) | 0.47 | 0.192 | 0.090 | 1310 | 60 | Crack | x |

As is clear from Table 2, the exhaust gas filters of the present invention satisfy the condition $0.12 \leq h \times d \leq 0.19$, where h is the specific heat (cal/g° C.) of the ceramic powder, constituting the body of the exhaust gas filter, and d is the bulk specific gravity (g/cm$^3$) of the exhaust gas filter. As compared with the conventional filters, in the filters according to the present invention, the abrupt temperature rise and the increase of the combustion temperature during the regeneration combustion are suppressed. As a result there are obtained the stable exhaust gas filters of the invention in which cracks and melting damage do not develop in the surface and interior of the exhaust gas filters. If the value h×d exceeds 0.19 (cal/cm$^3$° C.), the combustion temperature does not rise sufficiently and then any crack and any melting damage do not develop. However, in such case, due to low combustion temperature, the solid carbon component and the soluble organic component in the trapped black smoke particulates cannot be burned fully. Therefore, the condition $0.12 \leq h \times d \leq 0.19$ is preferable.

Further, with respect to the exhaust gas filter of the present invention, the test in which the filter is subjected to regeneration combustion after the black smoke is trapped is repeated 50 times under the same conditions as described above. Neither cracks nor melting damage is not developed in the exhaust gas filter. It is therefore confirmed that the exhaust gas filter of the invention has an excellent durability. In the exhaust gas filter of the invention, the regeneration combustion temperature at which the trapped particulates are burnt out by combustion is not more than 70% of the melting point of the ceramic material constituting the body of the exhaust gas filter.

On the other hand, with respect to the conventional exhaust gas filters, regardless of whether the filter body is made of cordierite or mullite, the product (h×d) of the bulk specific gravity d of the exhaust gas filter and the specific heat h of the ceramic powder constituting the filter body is smaller than that of the exhaust gas filters of the invention. Therefore, when the regeneration combustion, an abrupt temperature rise of more than 50° C./min. (which may be an abnormal combustion) occurs, and then the combustion temperature becomes high. As a result, the crack and the melting damage develops in the exhaust gas filter.

With respect to the conventional exhaust gas filter made of cordierite, the test in which the filter is subjected to the regeneration combustion after the black smoke is trapped is conducted under the same conditions as described above. During the second trapping operation of the filter, the black smoke appears from the exhaust outlet port 39 of the diesel engine, and therefore the exhaust gas filter is removed and inspected. As a result it is found that the cracks have developed in the surface of the filter, and the melting damage has developed locally in the interior of the filter.

As described above, if the bulk specific gravity d of the exhaust gas filter and the specific heat h of the ceramic powder constituting the body of the exhaust gas filter are selected so that the product h×d satisfies the relationship $0.12 \leq h \times d \leq 0.19$ (cal/cm$^3$° C.), there will not develop any crack due to a thermal stress produced by an abrupt temperature rise during the regeneration combustion. Besides, the combustion temperature is kept stable at a temperature of not more than 70% of the melting point of the ceramic material constituting the body of the exhaust gas filter, and when this exhaust gas filter is mounted on the diesel engine, the black smoke will not be discharged. Therefore, in the present invention, there can be provided the exhaust gas filter having the excellent reliability and durability, and also there can be provided various kinds of vehicles having a diesel engine provided with this exhaust gas filter.

(Second Embodiment)

Aluminum titanate powder composed mainly of aluminum titanate, a binder of methyl cellulose, a lubricant of polymeric ester, a pore-forming agent of an organic polymeric material, and water are blended in the ratio shown in Table 3. Then, they are mixed by a high-speed mixer for three minutes, and then kneaded twice through a screw-type kneader, and further passed through three rolling mills to form a ceramic plastic material.

TABLE 3

|  | Blend ratio (weight part) |
| --- | --- |
| Aluminum titanate powder | 100 |
| Binder | 18 |
| Lubricant | 4 |
| Pore-forming agent | 17 |
| Water | 28 |

Figure 2:
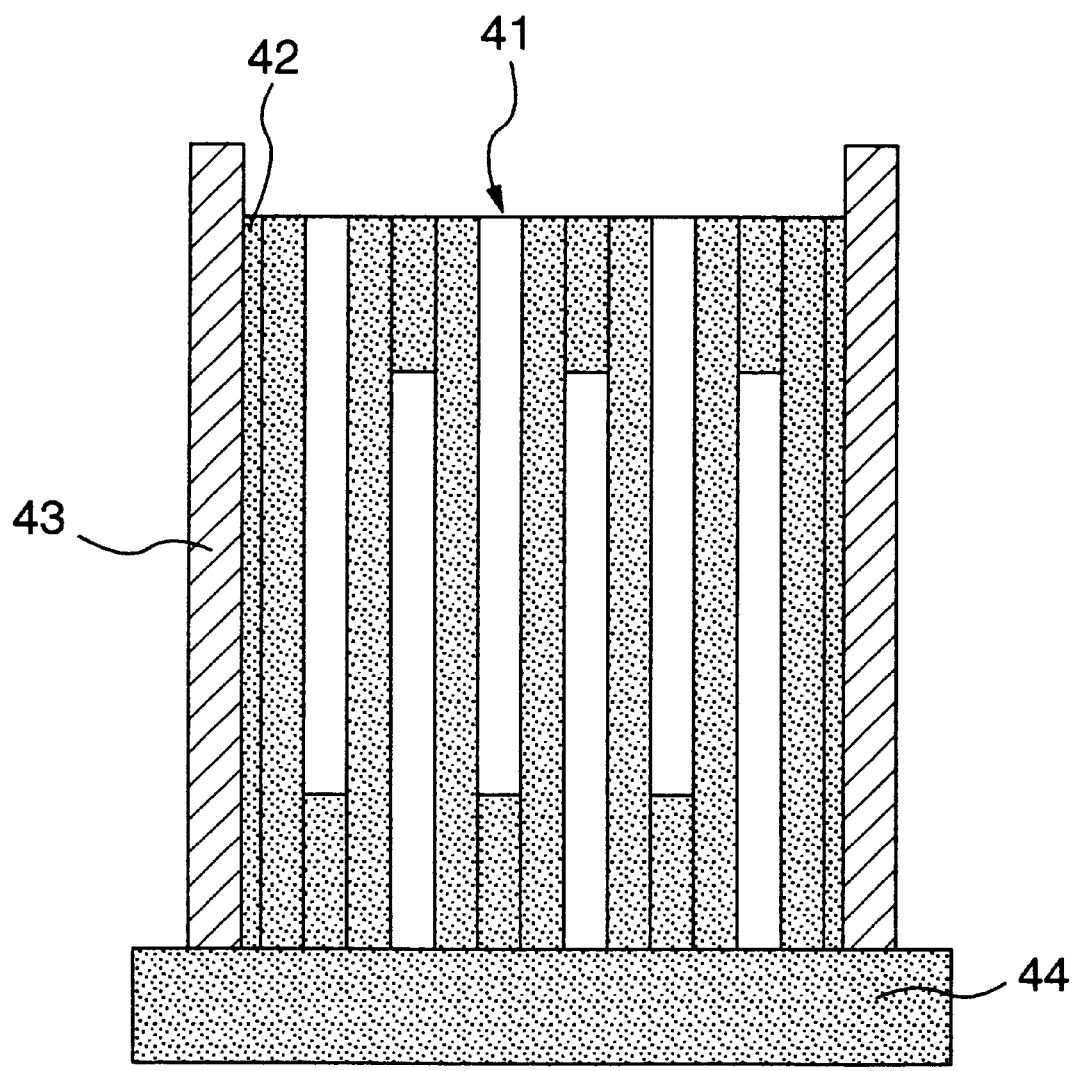
FIG. 2 is a cross-sectional view showing a filter body before baking thereof.
Figure 3:
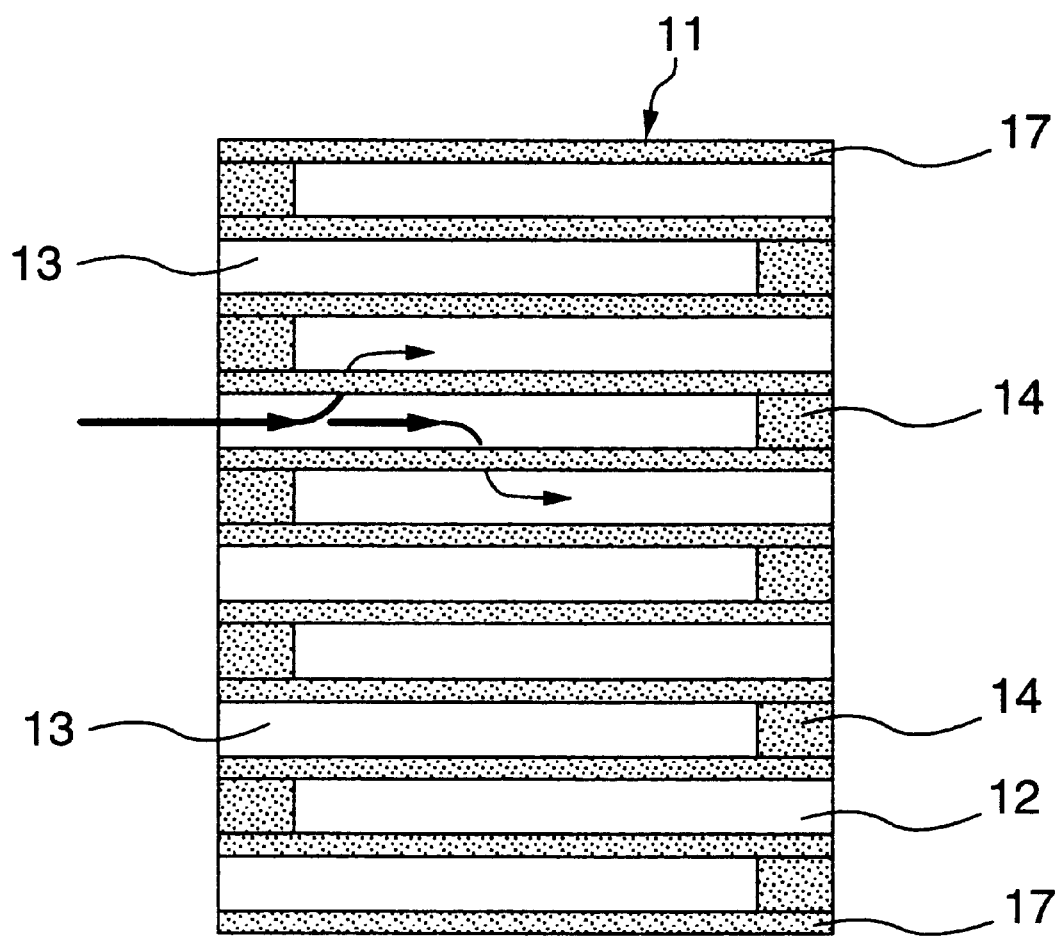
FIG. 3 is a cross-sectional view of a conventional ceramic monolithic filter.
Figure 4:
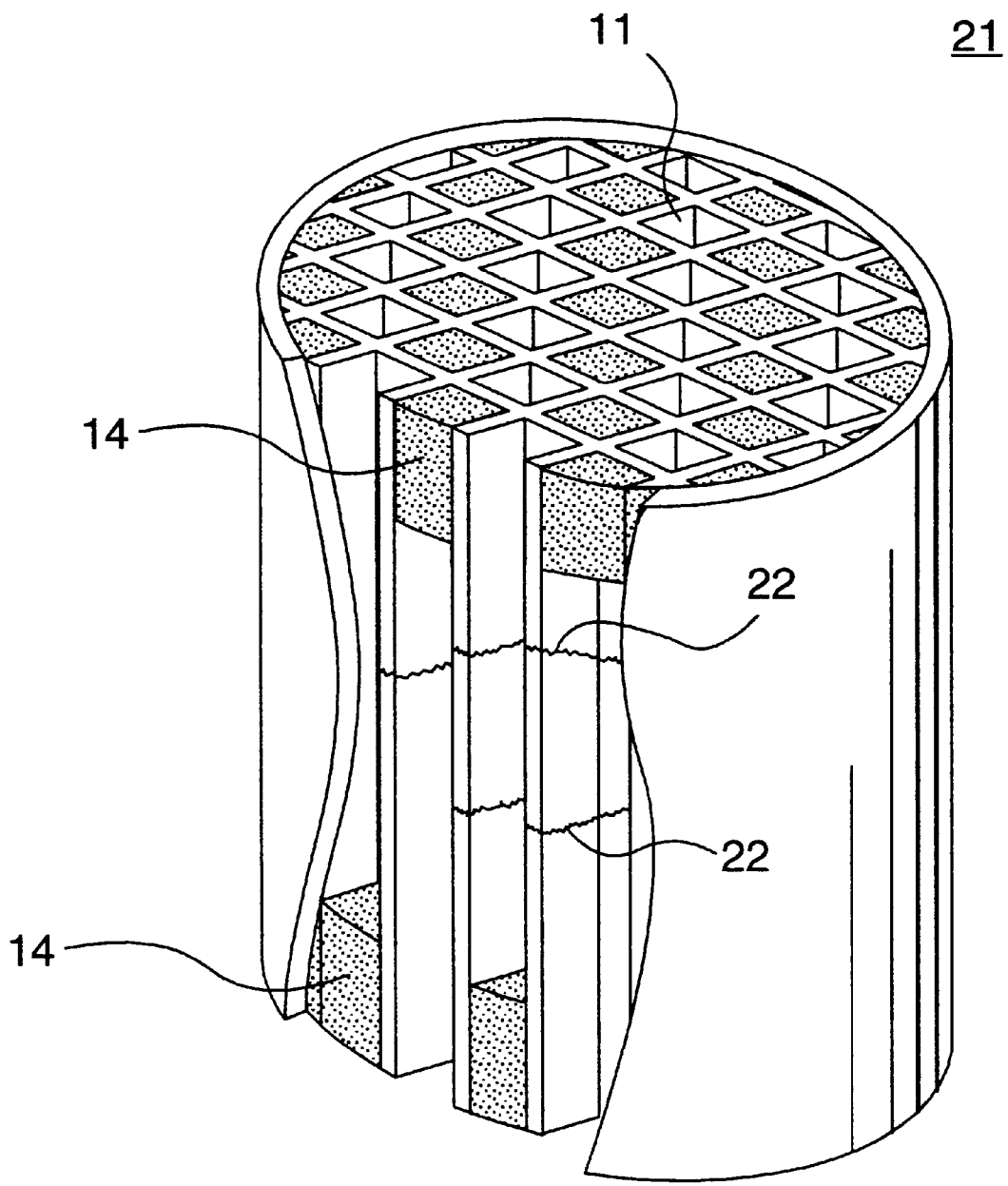
FIG. 4 is a perspective view showing the conventional exhaust gas filter after regeneration combustion.

Using a vacuum extruder having dies, the ceramic plastic material is formed into a filter body blank provided with a number of cells extending axially, whose diameter is about 170 mm and height is about 300 mm. Then, the extruded (molded) filter body blank is covered at an outer periphery thereof with a lapping film. The filter body blank is dried using a microwave dryer and a hot air-type dryer, and then bakes as shown in FIG. 2.

A sheath 43 and a ceramic base 44 defines therebetween a space for the filter body blank 41. Ceramic powder 42 of alumina is filled between the blank 41 and the sheath 43. The filter body blank 41 and the ceramic powder 42 are baked at a temperature between 1,470° C. and 1,530° C. for four hours, and then finished, thereby providing a baked filter body having a diameter of 140 mm, a height of 150 mm and a bulk specific gravity d of not less than 0.6 (g/cm$^3$).

One of opposite ends of each of cells of the baked filter body thus obtained is closed by a filler composed mainly of aluminum titanate, in such a manner that at ends of the filter body, the closed end of the cell and the open end of the cell alternate with one another. Then, the filter body with the fillers is dried and then heat-treated at a temperature of 1,350° C. to 1,400° C., thereby providing an exhaust gas filter of the invention. Like the exhaust gas filter of the first embodiment, the thus obtained exhaust gas filter body is a cylindrical body having a number of cells extending in the axial direction, and at ends of the filter body, the closed end of the cell and the open end of the cell alternate with one another. The exhaust gas filter does not have any structural defect (which would be caused by disadvantages encountered during the production) such as a crack in the surface and in the interior of the exhaust gas filter and deformation in porous partition walls, and therefore has the good configuration and structure.

Then, a bulk specific gravity d of the obtained exhaust gas filter and a specific heat h of the ceramic powder constituting the filter body are measured in the same manner as described for the first embodiment, and the product h×d is calculated, its value is 0.162 cal/cm$^3$° C. Then, this exhaust gas filter is mounted on an exhaust system of a diesel engine (manufactured by TOYOTA MOTOR COMPANY LTD.) with a displacement of 3,431 cc, and the engine is operated for a predetermined time period under predetermined conditions (torque: 21 Kgm; engine speed: 1,500 rpm). The black smoke particulates are trapped by the exhaust gas filter at a rate of 10 g per unit volume (1 liter) of the filter, and then the trapped black smoke particulates are burned out by an electric heater (serving as an ignition source) while feeding the air from a blower at a rate of about 50 liters per minute, thereby effecting the regeneration combustion of the exhaust gas filter. This process is repeated.

As a result, the diesel engine provided with the exhaust gas filter of the invention does not discharge the black smoke from an exhaust outlet port after the test (that is, the trap of the black smoke particulates and the regeneration combustion) is repeated 120 times, and also any crack and melting damage do not develop in the exhaust gas filter, and no trapped black smoke particulates remain unburned. Under the same conditions as described above, a conventional exhaust gas filter made of cordierite is tested. As a result, during the 15th trapping operation, the black smoke is discharged from the exhaust outlet port of the diesel engine, and it is found that the cracks and the melting damage have developed in the exhaust gas filter.

The main component of the body of the exhaust gas filter is not limited to aluminum titanate, and any other suitable main component may be used in so far as the bulk specific gravity d of the exhaust gas filter and the specific heat h of the ceramic powder constituting the body of the exhaust gas filter satisfy the following relation $0.12 \leq h \times d \leq 0.19$.

As described above, in this embodiment, also, there can be obtained the exhaust gas filter which satisfies the relation $0.12 \leq h \times d \leq 0.19$. Therefore, there can be achieved the diesel engine of excellent reliability provided with the exhaust gas filter in which neither crack nor melting damage due to an abrupt temperature rise during the regeneration combustion develops, and the trapped black smoke particulates do not remain unburned, thus enabling the good regeneration combustion.

In the present invention, there is provided the exhaust gas filter which satisfies the relation $0.12 \leq h \times d \leq 0.19$. Therefore, in the regeneration combustion after the black smoke containing the particulates from the diesel engine is trapped, the combustion temperature, at which the trapped particulates are burnt out, does not beyond 70% of the melting point of the ceramic material constituting the body of the exhaust gas filter. Further, since an abrupt temperature rise and an abnormal combustion are not encountered, there can be obtained the exhaust gas filter of excellent durability in which neither crack nor melting damage develops.

When the exhaust gas filter of the invention is mounted on the exhaust system of the diesel engine, black smoke is not discharged from the exhaust outlet port of the engine. Further, when the test (that is, the trap of the black smoke particulates and the regeneration combustion) is repeated, neither crack nor melting damage develop in the surface and in the interior of the exhaust gas filter, thus enabling the good regeneration combustion, and therefore there can be obtained the diesel engine having the excellent reliability.

What is claimed is:

1. An exhaust gas filter for trapping particulates in an exhaust gas in which the particulates are removed by means of regeneration combustion, said filter comprising:

(a) a cylindrical body comprising ceramic material, said body being dimensioned such that a specific heat h (cal/g° C.) of ceramic powder constituting said body and a bulk specific gravity d (g/cm$^3$) of said exhaust gas filter satisfy the relation 0.12 (cal/cm$^{3\circ}$ C.)$\leq h \times d \leq$0.19 (cal/cm$^{3\circ}$ C.);

(b) a plurality of hollow cells disposed in said body, each of said cells extending in the direction of a longitudinal axis of said body so as to have a first end and a second end disposed at opposite ends of said body; and (c) a plurality of fillers corresponding in number to said plurality of hollow cells, each of said fillers closing one of the opposite first end and second end of each of said cells so as to provide a plurality of cells having a closed end and an open end, such that at the opposite ends of said body, the closed ends and the open ends are arranged in an alternating configuration.

2. An exhaust gas filter according to claim 1, wherein the bulk specific gravity is from 0.6 (g/cm$^3$) to 1.0 (g/cm$^3$).

3. An exhaust gas filter according to claim 1, wherein said ceramic material comprises aluminum titanate as a main component.

4. A diesel engine comprising an exhaust system said exhaust system comprising an exhaust gas filter as defined in claim 1.

5. A diesel engine according to claim 4, wherein said ceramic material comprises aluminum titanate as a main component.

6. A method of producing an exhaust gas filter, comprising the steps of:

(a) extruding a ceramic plastic material containing a pore-forming agent so as to provide an extruded filter body blank comprising a plurality of hollow cells, each of said cells extending in the direction of a longitudinal axis of said extruded filter body blank so as to have a first end and a second end disposed at opposite ends of said body;

(b) drying said extruded filter body blank so as to provide a dried extruded filter body blank;

(c) baking said dried extruded filter body blank at a temperature of from 1,450° C. to 1,530° C. for from 1 hour to 4 hours; and (d) forming a plurality of exhaust gas passages by closing one of the opposite first end and second end of each of said cells with one of a plurality of fillers corresponding in number to said plurality of hollow cells, so as to provide a plurality of cells having a closed end and an open end, such that at the opposite ends of said body, the closed ends and the open ends are arranged in an alternating configuration.

7. A method according to claim 6, wherein said ceramic plastic material comprises aluminum titanate as a main component.

* * * * *